(12) United States Patent
Maric et al.

(10) Patent No.: US 11,822,081 B2
(45) Date of Patent: Nov. 21, 2023

(54) OPTICAL MODULE FOR HEAD-MOUNTED DEVICE

(71) Applicant: Apple Inc., Cupertino, CA (US)

(72) Inventors: Ivan S. Maric, Sunnyvale, CA (US); Jan K. Quijalvo, Mississauga (CA); Anna V. Mirabella, Palo Alto, CA (US); Wey-Jiun Lin, Los Altos Hills, CA (US); Jeremy C. Franklin, San Francisco, CA (US); Forrest C. Wang, Petaluma, CA (US); Marinus Meursing, Sunnyvale, CA (US); Blake N. Trekell, Cupertino, CA (US); Aidan N. Zimmerman, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/904,602

(22) Filed: Jun. 18, 2020

(65) Prior Publication Data
US 2021/0063744 A1 Mar. 4, 2021

Related U.S. Application Data

(60) Provisional application No. 62/893,396, filed on Aug. 29, 2019.

(51) Int. Cl.
*G02B 27/01* (2006.01)
*G02B 27/62* (2006.01)

(52) U.S. Cl.
CPC ......... *G02B 27/0172* (2013.01); *G02B 27/62* (2013.01); *G02B 2027/0138* (2013.01); *G02B 2027/0187* (2013.01)

(58) Field of Classification Search
CPC .... G02B 2027/0138; G02B 2027/0187; G02B 27/0172; G02B 27/62
See application file for complete search history.

(56) References Cited

U.S. PATENT DOCUMENTS

| 6,989,935 B2 | 1/2006 | Domjan et al. |
| 7,542,209 B2 | 6/2009 | McGuire, Jr. |

(Continued)

FOREIGN PATENT DOCUMENTS

| CN | 104317055 A | 1/2015 |
| CN | 105531716 A | 4/2016 |

(Continued)

OTHER PUBLICATIONS

International Search Report and Written Opinion dated Oct. 8, 2020, in co-pending Intl Application No. PCT/US2020/043677 (14 pp).

*Primary Examiner* — Dmitriy Bolotin
(74) *Attorney, Agent, or Firm* — Young Basile Hanlon & MacFarlane, P.C.

(57) ABSTRACT

An optical module for a head-mounted device is configured to present content to a user. The optical module includes an optical module housing assembly, a display assembly, and an eye camera. The optical module housing assembly has a first end and a second end. The lens is connected to the optical module housing assembly and positioned at the first end of the optical module housing assembly. The display assembly is connected to the optical module housing assembly and is positioned at the second end of the optical module housing assembly. The display assembly is configured to cause the content to be displayed to the user through the lens. The eye camera is connected to the optical module housing assembly and is positioned at the second end of the optical module housing assembly. The eye camera is configured to obtain images through the lens.

28 Claims, 16 Drawing Sheets

(56) References Cited

U.S. PATENT DOCUMENTS

| | | | |
|---|---|---|---|
| 7,542,210 B2 * | 6/2009 | Chirieleison, Sr. | .......................... G02B 27/0093 345/8 |
| 8,487,838 B2 * | 7/2013 | Lewis | ................. G02B 27/017 345/8 |
| 8,964,298 B2 | 2/2015 | Haddick et al. | |
| 8,998,414 B2 * | 4/2015 | Bohn | ................. G02B 27/0093 351/210 |
| 9,880,441 B1 * | 1/2018 | Osterhout | .......... G02B 27/0176 |
| 10,073,268 B2 * | 9/2018 | Alexander | .......... G02B 27/0103 |
| 10,203,489 B2 | 2/2019 | Khan et al. | |
| 10,261,332 B1 | 4/2019 | Hebert | |
| 10,598,942 B1 * | 3/2020 | Richards | ............ G02B 27/0172 |
| 10,699,389 B2 * | 6/2020 | Van der Auwera | ..... G06T 5/006 |
| 2002/0167462 A1 * | 11/2002 | Lewis | ................. G06F 3/013 345/7 |
| 2008/0151184 A1 * | 6/2008 | Spivey | ................. G02C 13/003 351/178 |
| 2011/0026014 A1 * | 2/2011 | Mack | ..................... H04N 5/232 356/124 |
| 2013/0077049 A1 * | 3/2013 | Bohn | ................... G02B 27/017 351/210 |
| 2013/0161078 A1 | 6/2013 | Li | |
| 2015/0243937 A1 | 8/2015 | Dinh et al. | |
| 2016/0363995 A1 | 12/2016 | Rougeaux | |
| 2017/0102546 A1 | 4/2017 | Tempel et al. | |
| 2017/0102549 A1 | 4/2017 | Lee et al. | |
| 2017/0140224 A1 * | 5/2017 | Wilson | ................... H04N 5/247 |
| 2017/0246070 A1 | 8/2017 | Osterhout et al. | |
| 2017/0262703 A1 * | 9/2017 | Wilson | ................. G02B 27/017 |
| 2017/0345136 A1 * | 11/2017 | Van der Auwera | ..... G06T 5/006 |
| 2017/0358136 A1 | 12/2017 | Gollier et al. | |
| 2018/0039052 A1 * | 2/2018 | Khan | ................. G02B 17/0856 |
| 2018/0101013 A1 * | 4/2018 | Moore | ................. G09G 3/001 |
| 2018/0113508 A1 | 4/2018 | Berkner-Cieslicki et al. | |
| 2018/0157320 A1 | 6/2018 | Trail | |
| 2018/0203505 A1 * | 7/2018 | Trail | ....................... G06F 1/163 |
| 2018/0217637 A1 | 8/2018 | Zou et al. | |
| 2018/0231782 A1 | 8/2018 | Jung et al. | |
| 2018/0239146 A1 | 8/2018 | Bierhuizen et al. | |
| 2018/0267320 A1 | 9/2018 | Chen et al. | |
| 2019/0028697 A1 | 1/2019 | Sullivan et al. | |
| 2019/0064525 A1 | 2/2019 | Mongoven | |
| 2019/0075689 A1 | 3/2019 | Selvakumar et al. | |
| 2019/0111508 A1 | 4/2019 | Dabov et al. | |
| 2020/0012101 A1 * | 1/2020 | Yuki | ................... G02B 27/0101 |
| 2020/0174284 A1 * | 6/2020 | Chan | ................... G02F 1/13306 |
| 2020/0249480 A1 * | 8/2020 | Martinez | ........... G02F 1/133528 |
| 2021/0132384 A1 * | 5/2021 | Liao | ................... G02B 27/0172 |

FOREIGN PATENT DOCUMENTS

| | | | |
|---|---|---|---|
| CN | 105718046 A | 6/2016 | |
| CN | 106796354 A | 5/2017 | |
| CN | 107533231 A | 1/2018 | |
| CN | 108474952 A | 8/2018 | |
| CN | 108664118 A | 10/2018 | |
| CN | 110168428 A | 8/2019 | |
| JP | H06138369 A | 5/1994 | |
| JP | H07185871 A | 7/1995 | |
| JP | H07234375 A | 9/1995 | |
| JP | 2010250211 A | 11/2010 | |
| JP | 2015087525 A | 5/2015 | |
| JP | 2015106915 A | 6/2015 | |
| JP | 2018528628 A | 9/2018 | |
| JP | 2018190825 A | 11/2018 | |
| JP | 2019516204 A | 6/2019 | |
| WO | 2016157485 A1 | 10/2016 | |
| WO | 2017104018 A1 | 6/2017 | |
| WO | 2018075949 A1 | 4/2018 | |
| WO | WO-2018181144 A1 * | 10/2018 | ......... G02B 27/0101 |
| WO | 2018213010 A1 | 11/2018 | |

* cited by examiner

OPTICAL MODULE FOR HEAD-MOUNTED DEVICE

CROSS-REFERENCE TO RELATED APPLICATIONS

This application claims the benefit of U.S. Provisional Application Ser. No. 62/893,396, filed on Aug. 29, 2019, the content of which is hereby incorporated by reference in its entirety herein for all purposes.

FIELD

The present disclosure relates generally to the field of head-mounted devices.

BACKGROUND

Head-mounted devices include display screens and optics that guide light from the display screens to a user's eyes. By guiding light to each of the user's eye's separately, content can be displayed to the user in stereo vision, for example, as part of a computer-generated reality (CGR) experience.

SUMMARY

One aspect of the disclosure is an optical module for a head-mounted device that is configured to present content to a user. The optical module includes an optical module housing assembly, a display assembly, and an eye camera. The optical module housing assembly has a first end and a second end. The lens is connected to the optical module housing assembly and positioned at the first end of the optical module housing assembly. The display assembly is connected to the optical module housing assembly and is positioned at the second end of the optical module housing assembly. The display assembly is configured to cause the content to be displayed to the user through the lens. The eye camera is connected to the optical module housing assembly and is positioned at the second end of the optical module housing assembly. The eye camera is configured to obtain images through the lens.

In some implementations of the optical module, the optical module housing assembly includes a first portion that is connected to a second portion, and the lens is retained between the first portion and the second portion. In some implementations of the optical module, projections are defined on the lens and channels are defined on the first portion of the optical module housing assembly such that the projections are located in the channels and engage the first portion of the optical module housing assembly within the channels to secure the lens relative to the optical module housing assembly and restrain movement of the lens relative to the optical module housing assembly. In some implementations of the optical module, the lens and the display assembly are connected to the optical module housing assembly in a side-by-side arrangement. In some implementations of the optical module, the optical module housing assembly defines an internal space between the lens and the display assembly.

In some implementations of the optical module, the optical module also includes a vent port that allows air to travel between the internal space and an outside environment, and a filter element that restrains foreign particles from entering the internal space. In some implementations of the optical module, the optical module also includes a dust trap that is located in the internal space and is configured to retain foreign particles.

In some implementations of the optical module, the optical module also includes a fiducial marker that is formed on the lens and is visible in images obtained by the eye camera for use in calibration. In some implementations of the optical module, the lens is a catadioptric lens. In some implementations of the optical module, the lens is a part of a catadioptric optical system.

Another aspect of the disclosure is an optical module for a head-mounted device that is configured to present content to a user. The optical module includes an optical module housing assembly that defines an internal space, a lens that is connected to the optical module housing assembly, a display assembly that is connected to the optical module housing assembly. The display assembly is configured to cause the content to be displayed to the user through the lens. An infrared emitter is located between the lens and the display assembly in the internal space of the optical module housing assembly. The infrared emitter is configured to emit infrared radiation through the lens.

In some implementations of the optical module, the infrared emitter includes a flexible circuit and emissive components that are connected to the flexible circuit and are configured to emit infrared radiation. In some implementations of the optical module, wherein the emissive components are arranged in an array around an optical axis of the optical module housing assembly. In some implementations of the optical module, the flexible circuit extends through an electrical port that is formed through the optical module housing assembly and a sealing element is formed on the flexible circuit and is engaged with the optical module housing assembly at the electrical port. In some implementations of the optical module, the optical module housing assembly defines an optical pathway opening that is adjacent to the display assembly and is configured to allow light to pass from the display assembly to the lens, a base surface that extends around the optical pathway opening, wherein the infrared emitter is located on the base surface, and a peripheral wall that is located outward from the base surface.

In some implementations of the optical module, the optical module also includes an eye camera that is configured to obtain images that show reflected portions of the infrared radiation that is emitted by the infrared emitter. In some implementations of the optical module, the eye camera is connected to the optical module housing assembly and is configured to obtain the images through the lens. In some implementations of the optical module, the lens is a catadioptric lens. In some implementations of the optical module, the lens is a part of a catadioptric optical system.

Another aspect of the disclosure is a head-mounted device that is configured to present content to a user. The head-mounted device includes a housing, a first optical module that is located in the housing, and a second optical module that is located in the housing. An interpupillary distance adjustment assembly supports the first optical module and the second optical module with respect to the housing to allow adjustment of a distance between the first optical module and the second optical module. The head-mounted device also includes a first front-facing camera that is connected to the first optical module and is movable in unison with the first optical module by the interpupillary distance adjustment assembly, and a second front-facing camera that is connected to the second optical module and is movable in unison with the second optical module by the interpupillary distance adjustment assembly. Adjustment of the distance between the first optical module and the second optical module by the interpupillary distance adjustment assembly also adjusts a distance between the first front-facing camera and the second front-facing camera.

In some implementations of the head-mounted device, the housing includes one or more optically-transmissive panels through which the first front-facing camera and the second front-facing camera may obtain images of an environment.

In some implementations of the head-mounted device, an optical axis of the first front-facing camera is aligned with an optical axis of the first optical module and an optical axis of the second front-facing camera is aligned with an optical axis of the second optical module.

In some implementations of the head-mounted device, the first front-facing camera is connected in a fixed relationship with respect to the first optical module, and the second front-facing camera is connected in a fixed relationship with respect to the second optical module.

In some implementations of the head-mounted device, the interpupillary distance adjustment assembly maintains a first spacing between an optical axis of the first optical module and an optical axis of the second optical module generally equal to a second spacing between an optical axis of the first front-facing camera and an optical axis of the second front facing camera during adjustment of the distance between the first optical module and the second optical module.

DETAILED DESCRIPTION

The disclosure herein relates to head-mounted devices that are used to show computer-generated reality (CGR) content to users. Head-mounted devices and intended to be worn by users on their heads, and typically with display devices and associated optical components located near the user's eyes. Some head-mounted devices utilize an optical architecture that requires a specific distance (or a relatively small range of distances) between a display screen and a lens assembly and a specific approximate distance between the lens assembly and a user's eye. The systems and methods herein relate to structural features of optical modules and head-mounted devices that accommodate significant reductions in these distances, which reduces the overall package size of the device.

Figure 1:
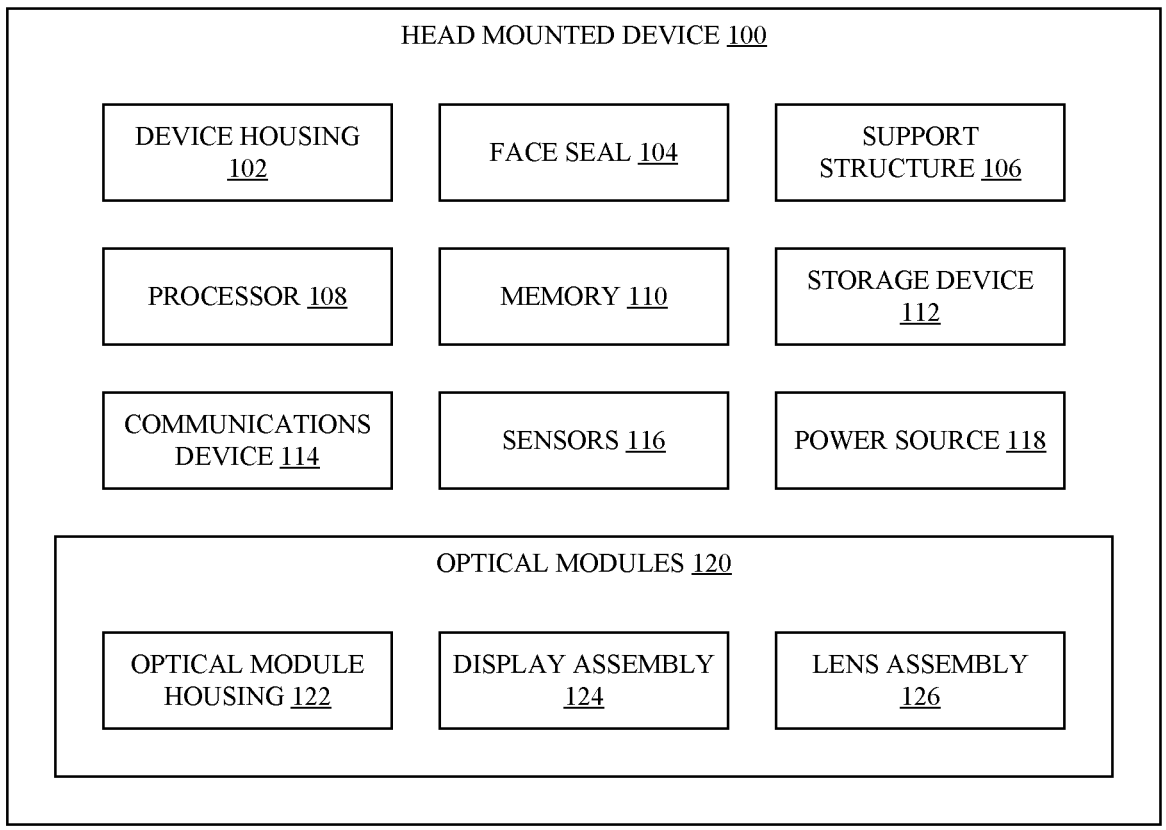
FIG. 1 is a block diagram that shows an example of a hardware configuration for a head-mounted device.

FIG. 1 is a block diagram that shows an example of a hardware configuration for a head-mounted device 100. The head-mounted device 100 is intended to be worn on the head of a user and includes components that are configured to display content to the user. Components that are included in the head-mounted device 100 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. In the illustrated example, the head-mounted device 100 includes a device housing 102, a face seal 104, a support structure 106, a processor 108, a memory 110, a storage device 112, a communications device 114, sensors 116, a power source 118, and optical modules 120. The head-mounted device 100 includes two of the optical modules 120, to display content to the user's eyes. The optical modules 120 may each include an optical module housing 122, a display assembly 124, and a lens assembly 126.

The device housing 102 is a structure that supports various other components that are included in the head-mounted device. The device housing 102 may be an enclosed structure such that certain components of the head-mounted device 100 are contained within the device housing 102 and thereby protected from damage.

The face seal 104 is connected to the device housing 102 and is located at areas around a periphery of the device housing 102 where contact with the user's face is likely. The face seal 104 functions to conform to portions of the user's face to allow the support structure 106 to be tensioned to an extent that will restrain motion of the device housing 102 with respect to the user's head. The face seal 104 may also function to reduce the amount of light from the physical environment around the user that reaches the user's eyes.

The face seal 104 may contact areas of the user's face, such as the user's forehead, temples, and cheeks. The face seal 104 may be formed from a compressible material, such as open-cell foam or closed cell foam.

The support structure 106 is connected to the device housing 102. The support structure 106 is a component or collection of components that function to secure the device housing 102 in place with respect to the user's head so that the device housing 102 is restrained from moving with respect to the user's head and maintains a comfortable position during use. The support structure 106 can be implemented using rigid structures, elastic flexible straps, or inelastic flexible straps.

The processor 108 is a device that is operable to execute computer program instructions and is operable to perform operations that are described by the computer program instructions. The processor 108 may be implemented using a conventional device, such as a central processing unit, and provided with computer-executable instructions that cause the processor 108 to perform specific functions. The processor 108 may be a special-purpose processor (e.g., an application-specific integrated circuit or a field-programmable gate array) that implements a limited set of functions. The memory 110 may be a volatile, high-speed, short-term information storage device such as a random-access memory module.

The storage device 112 is intended to allow for long term storage of computer program instructions and other data. Examples of suitable devices for use as the storage device 112 include non-volatile information storage devices of various types, such as a flash memory module, a hard drive, or a solid-state drive.

The communications device 114 supports wired or wireless communications with other devices. Any suitable wired or wireless communications protocol may be used.

The sensors 116 are components that are incorporated in the head-mounted device 100 to provide inputs to the processor 108 for use in generating CGR content. The sensors 116 include components that facilitate motion tracking (e.g., head tracking and optionally handheld controller tracking in six degrees of freedom). The sensors 116 may also include additional sensors that are used by the device to generate and/or enhance the user's experience in any way. The sensors 116 may include conventional components such as cameras, infrared cameras, infrared emitters, depth cameras, structured-light sensing devices, accelerometers, gyroscopes, and magnetometers. The sensors 116 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 116. The information that is generated by the sensors 116 is provided to other components of the head-mounted device 100, such as the processor 108, as inputs.

The power source 118 supplies electrical power to components of the head-mounted device 100. In some implementations, the power source 118 is a wired connection to electrical power. In some implementations, the power source 118 may include a battery of any suitable type, such as a rechargeable battery. In implementations that include a battery, the head-mounted device 100 may include components that facilitate wired or wireless recharging.

In some implementations of the head-mounted device 100, some or all of these components may be included in a separate device that is removable. For example, any or all of the processor 108, the memory 110, and/or the storage device 112, the communications device 114, and the sensors 116 may be incorporated in a device such as a smart phone that is connected (e.g., by docking) to the other portions of the head-mounted device 100.

In some implementations of the head-mounted device 100, the processor 108, the memory 110, and/or the storage device 112 are omitted, and the corresponding functions are performed by an external device that communicates with the head-mounted device 100. In such an implementation, the head-mounted device 100 may include components that support a data transfer connection with the external device using a wired connection or a wireless connection that is established using the communications device 114.

The components that are included in the optical modules support the function of displaying content to the user in a manner that supports CGR experiences. The optical modules 120 are each assemblies that include multiple components, which include the optical module housing 122, the display assembly 124, and the lens assembly 126, as will be described further herein.

Other components may also be included in each of the optical modules. Although not illustrated in FIGS. 2-3, the optical modules 120 may be supported by adjustment assemblies that allow the position of the optical modules 120 to be adjusted. As an example, the optical modules 120 may each be supported by an interpupillary distance adjustment mechanism that allows the optical modules 120 to slide laterally toward or away from each other. As another example, the optical modules 120 may be supported by an eye relief distance adjustment mechanism that allows adjustment of the distance between the optical modules 120 and the user's eyes.

Figure 2:
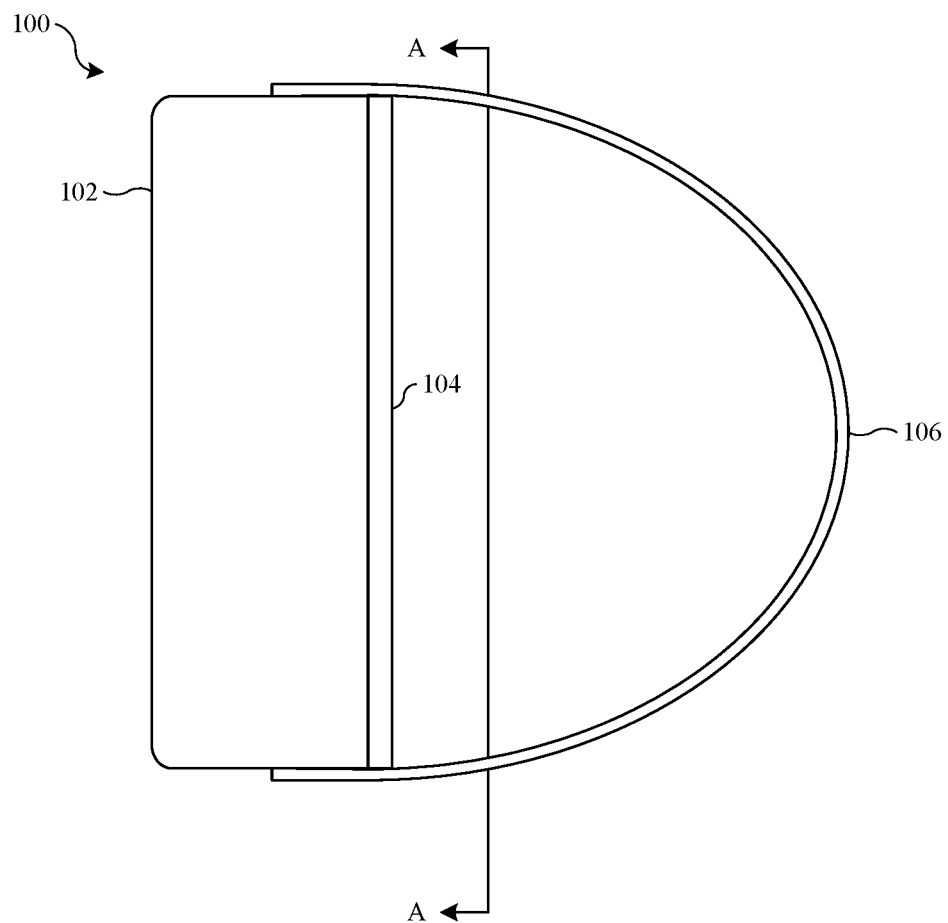
FIG. 2 is a top view illustration that shows the head-mounted device, including a device housing and a support structure.
Figure 3:
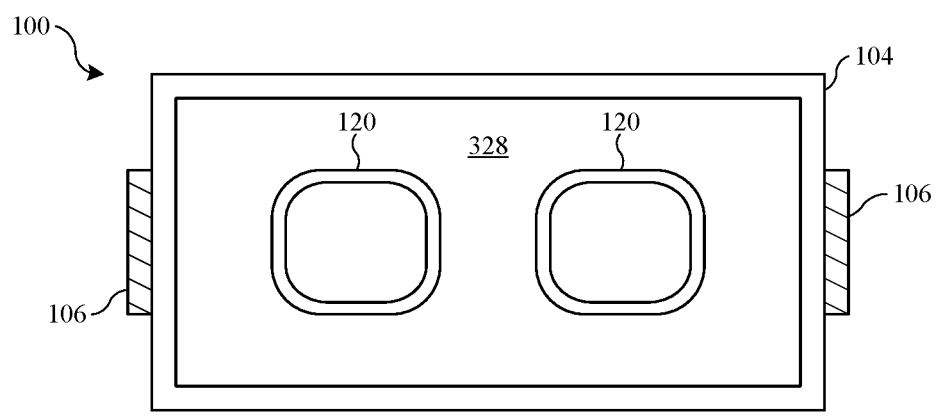
FIG. 3 is a rear view illustration taken along line A-A of FIG. 2 that shows the device housing.

FIG. 2 is a top view illustration that shows the head-mounted device 100, including the device housing 102, the face seal 104, and the support structure 106. FIG. 3 is a rear view illustration taken along line A-A of FIG. 2. In the illustrated example, the device housing 102 is a generally rectangular structure having a width that is selected to be similar to the width of the head of a typical person, and a height selected so as to extend approximately from the forehead to the base of the nose of a typical person. This configuration is an example, and other shapes and sizes may be used.

An eye chamber 328 is defined by the device housing 102 and is bordered by the face seal 104 at its outer periphery. The eye chamber 328 is open to the exterior of the head-mounted device 100 to allow the user's face to be positioned adjacent to the eye chamber 328, which is otherwise enclosed by the device housing 102. The face seal 104 may extend around part or all of the periphery of the device housing 102 adjacent to the eye chamber 328. The face seal 104 may function to exclude some of the light from the environment around the head-mounted device 100 from entering the eye-chamber 328 and reaching the user's eyes.

In the illustrated example, the support structure 106 is a headband type device that is connected to left and right lateral sides of the device housing 102 and is intended to extend around the user's head. Other configurations may be used for the support structure 106, such as a halo-type configuration in which the device housing 102 is supported by a structure that is connected to a top portion of the device housing 102, engages the user's forehead above the device housing 102, and extends around the user's head, or a mohawk-type configuration in which a structure extends over the user's head. Although not illustrated, the support structure 106 may include passive or active adjustment components, which may be mechanical or electromechanical, that allow portions of the support structure 106 to expand and contract to adjust the fit of the support structure 106 with respect to the user's head.

The optical modules 120 are located in the device housing 102 and extend outward into the eye chamber 328. Portions of the optical modules 120 are located in the eye chamber 328 so that the user can see the content that is displayed by the optical modules 120. The optical modules 120 are located within the eye chamber 328 at locations that are intended to be adjacent to the user's eyes. As an example, the head-mounted device 100 may be configured to position portions of the lens assemblies 126 of the optical modules 120 approximately 15 millimeters from the user's eyes.

Figure 4:
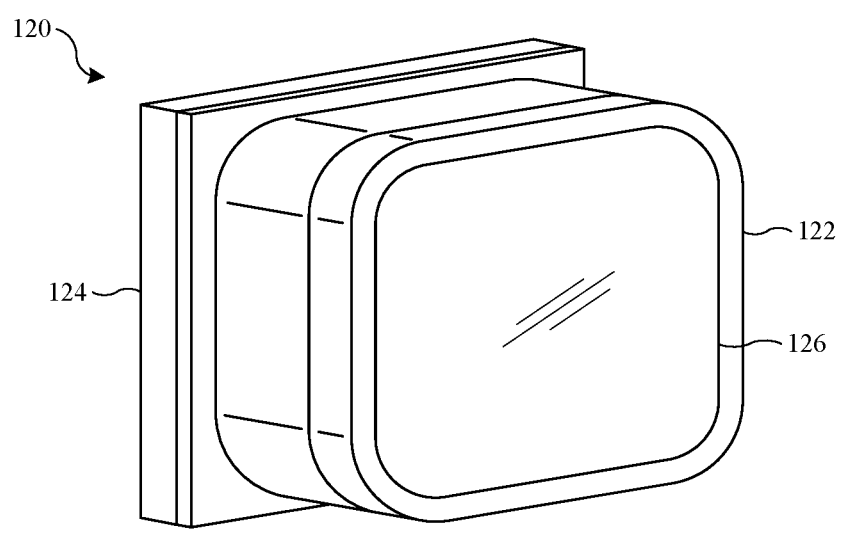
FIG. 4 is a perspective view illustration that shows an optical module of the head-mounted device.

FIG. 4 is a perspective view illustration that shows one of the optical modules 120, including the optical module housing 122, the display assembly 124, and the lens assembly 126. The display assembly 124 and the lens assembly 126 are each connected to the optical module housing 122. In the illustrated example, the lens assembly 126 is positioned at a front end of the optical module 120, and the display assembly 124 is positioned at a rear end of the optical module 120. The optical module housing 122 defines an internal space between the display assembly 124 and the lens assembly 126 to allow light to travel from the display assembly 124 to the lens assembly 126 within an environment that is sealed and protected from external contaminants while protecting sensitive components from damage.

The display assembly 124 includes a display screen that is configured to display content, such as images, according to signals received from the processor 108 and/or from external devices using the communications device 114 in order to output CGR content to the user. As an example, the display assembly 124 may output still images and/or video images in response to received signals. The display assembly 124 may include, as examples, an LED screen, an LCD screen, an OLED screen, a micro LED screen, or a micro OLED screen.

The lens assembly 126 includes one or more lenses that direct light to the user's eyes in a manner that allows viewing of CGR content. In some implementations, the lens assembly 126 is a catadioptric optical system that utilizes both reflection and refraction in order to achieve desired optical properties in a small package size. Reflection, in some implementations, may be achieved by internal reflection at boundaries between material layers of a single lens. Thus, in some implementations, the lens assembly 126 may be implemented using a single multi-layered catadioptric lens.

The lens assembly 126 may be positioned partially within the optical module housing 122. As will be explained further herein, the optical module housing 122 may include two or more components that are configured to retain the lens assembly in a desired position and orientation.

Figure 5:
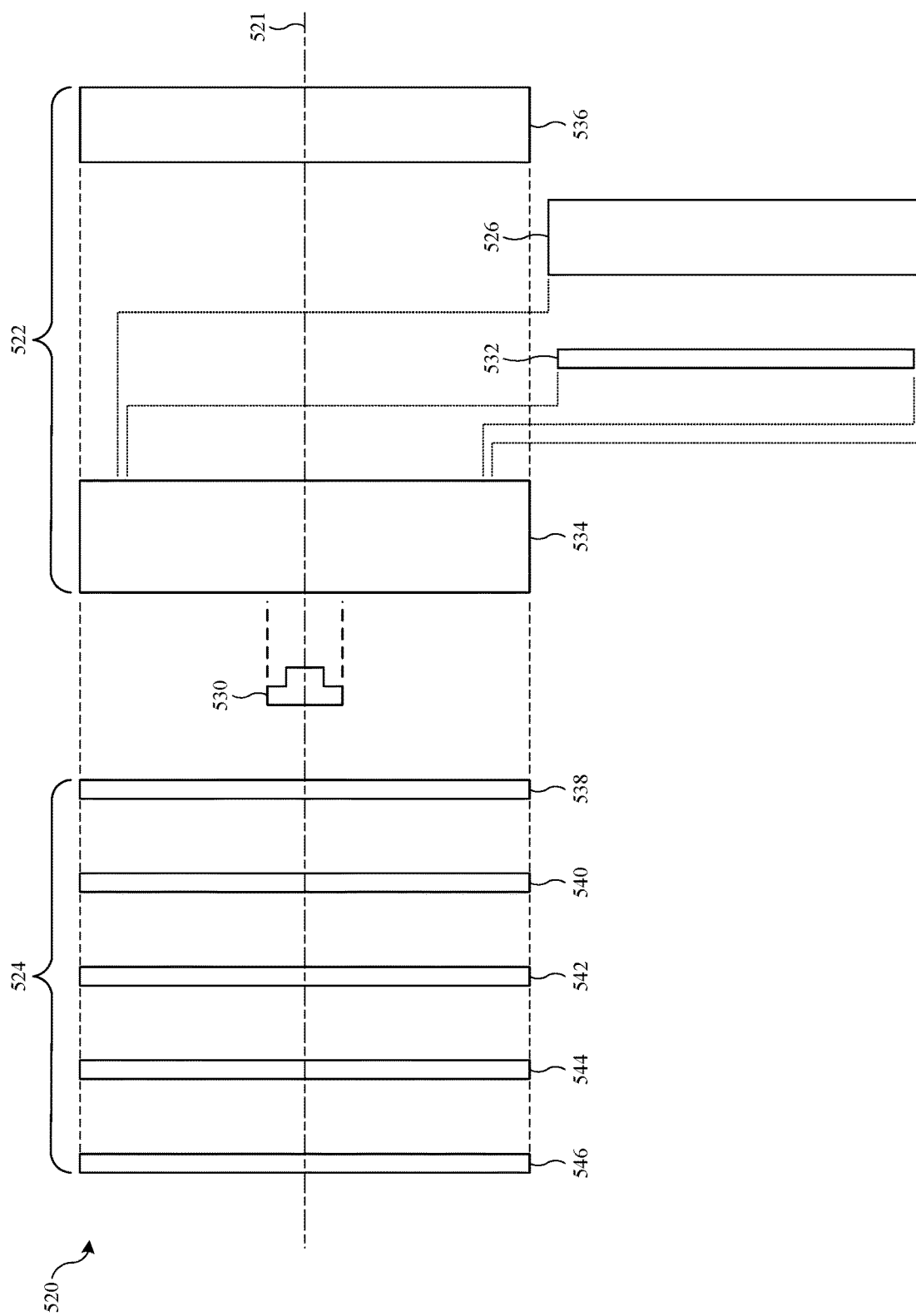
FIG. 5 is an exploded side view diagram showing components of an optical module according to an example.

FIG. 5 is an exploded side view diagram showing components of an optical module 520 according to a first example. FIG. 5 is a schematic view intended to show the positional relationships between various features and does not include specific structural details of the components of the optical module 520. The optical module 520 can be implemented in the context of a head-mounted display (e.g., the head-mounted device 100) and may be implemented according to the description of the optical module 120 and the further description herein. The optical module 520 includes an optical module housing assembly 522, a display assembly 524, a lens 526, an eye camera 530, and an infrared emitter 532. As will be described further herein, these components are arranged along an optical axis 521 of the optical module 520 such that images generated using the display assembly are projected to the user along the optical axis 521.

Although the lens 526 is described as a single element herein, it should be understood that the lens 526 may be part of an assembly of optical elements or may be an assembly of optical elements, as described with respect to the lens assembly 126. Thus, for example the lens 526 may be a catadioptric lens or the lens 526 may be part of a catadioptric optical system.

The optical module housing assembly 522 may include multiple parts that are connected to each other. In the illustrated example, the optical module housing assembly 522 includes a housing body 534 and a retainer 536. The housing body 534 is configured to be connected to other structures within the housing of a head-mounted display (e.g., in the device housing 102 of the head-mounted device 100). The housing body 534 is also provides a structure to which other components of the optical module 520 may be attached, including the display assembly 524, the eye camera 530 and the infrared emitter 532. The primary portions of the optical module housing assembly 522, such as the housing body 534 and the retainer 536, may be made from a rigid material, such as plastic or aluminum. The optical module housing assembly 522 is arranged around the optical axis 521, and both visible light and infrared radiation may be incident on surfaces of the optical module housing assembly 522. For this reason, portions of the optical module housing assembly 522 may be coated with materials (e.g., paints or other coating materials) that exhibit low reflectance of both visible and infrared wavelengths of electromagnetic radiation.

The retainer 536 is connected to an outer (e.g., user-facing) end of the housing body 534 of the optical module 520. As examples, the retainer 536 may be connected to the housing body 534 by fasteners or by an adhesive. The retainer 536 and the housing body 534 of the optical module housing assembly 522 are configured such that the lens 526 is retained between the retainer 536 and the housing body 534, as will be explained further herein. The retainer 536 and the housing body 534 have ring-like configurations along the optical axis 521 to allow light from the display assembly 524 to pass through the lens 526 and toward the user.

The display assembly 524 includes a seal 538, a bezel 540, a display module 542, a thermal interface 544, and a heat sink 546. The display assembly 524 is connected to the optical module housing assembly 522. As an example, the display assembly 524 may be connected to the optical module housing assembly 522 by screws or other fasteners that allow disassembly of the display assembly 524 from the optical module housing assembly 522 (e.g., to allow for inspection and/or repair). The seal 538 is a sealing material of any suitable type that is configured to prevent foreign particle (e.g., dust) intrusion at the interface of the display assembly 524 with the optical module housing assembly 522. The bezel 540 is a structural component that supports the display module 542 and protects it from damage. As an example, bezel 540 may be connected to the heat sink 546 (e.g., by screws or other fasteners) to capture the display module 542 and the heat sink 546. The seal 538 may be engaged with the bezel 540 and the optical module housing assembly 522 to seal the interface between them.

The seal 538 and the bezel 540 have a ring-like configuration with central openings along the optical axis 521 in order to avoid blocking light emission from the display module 542 toward the lens 526.

The display module 542 includes a display screen that displays images (e.g., by emitting light using a grid of light-emitting elements to define a picture). The display module 542 may be implemented using any suitable display technology, including light-emitting diode-based display technologies, organic light-emitting diode-based display technologies, and micro light-emitting diode-based display technologies. In some implementations, a layer of cover glass is attached (e.g., by laminating) to the display surface of the display module 542 to provide strength, to serve as a mounting feature, and to serve as a sealing interface.

The thermal interface 544 is a thermally conductive and electrically non-conductive material that is located between the display module 542 and the heat sink 546 to promote heat transfer from the display module 542 to the heat sink 546. The thermal interface 544 is a compliant material that is able to fill in gaps that would otherwise be present between the display module 542 and the heat sink 546, and which would reduce the efficiency of heat transfer. As an example, the thermal interface may be dispensable thermal gel that is applied to the display module 542 or the heat sink 546. A reworkable material may be used for the thermal interface 544, such as a material that is applied by room-temperature vulcanization.

The heat sink 546 is a rigid structure (e.g., formed from metal) that readily conducts heat and is configured to release heat to the ambient environment. As an example, the heat sink 546 may incorporate structures that increase surface area, such as fins, to promote heat dissipation, and/or may include features that conduct heat away from heat-generating components (e.g., the display module 542), such as a heat pipe.

Figure 6:
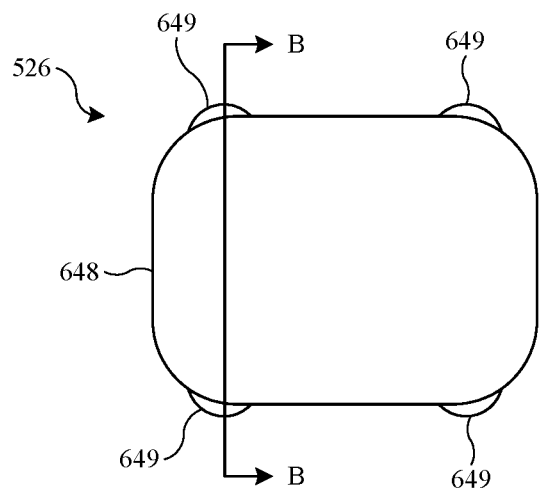
FIG. 6 is a front view that shows the lens according to an example.
Figure 7:
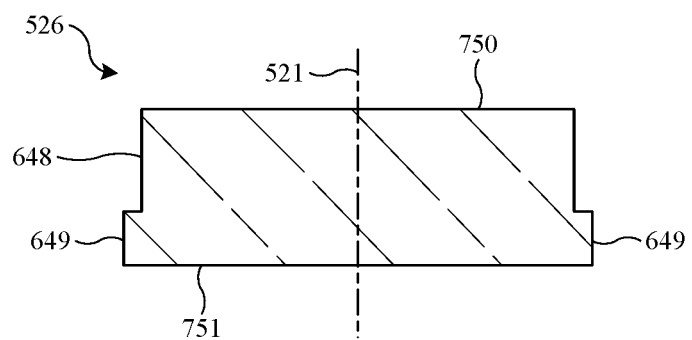
FIG. 7 is a cross-section view taken along line B-B of FIG. 6 showing the lens.

FIG. 6 is a front view illustration that shows the lens 526 according to an example, and FIG. 7 is a cross-section view illustration taken along line B-B of FIG. 6 showing the lens 526. The lens 526 is an optical element (or combination of multiple optical elements, e.g., multiple lenses) that is configured to refract and/or reflect light that is incident on the lens 526. In the illustrated example, the lens 526 is formed from molded transparent plastic, by glass may be used. Surface configurations that cause refraction and/or reflection of light (e.g., convexity and concavity) are not shown in the figures for simplicity and clarity, and these features may be defined as needed for desired performance of the optical system.

The lens 526 includes a lens body 648 and projections 649 that extend outward from the lens body 648. The lens body 648 extends from an outer surface 750 (oriented toward the user) to an inner surface 751 (oriented toward the display assembly 524. The lens body 648 will typically have a width (or range of widths) that is greater than the height of the lens body 648 as measured along the optical axis 521 of the optical module 520. The lens body 648 may be formed in any shape (as viewed from an end along the optical axis 521), such as generally cylindrical, oval, rounded rectangle, or irregular. The projections 649 may have a height (in the direction of the optical axis 521) that is less than the height of the lens body 648, such as 10 percent to 50 percent of the height of the lens body 648. As will be explained herein, the projections 649 facilitate alignment and retention of the lens 526 relative to the optical module housing assembly 522.

In the illustrated example, a peripheral wall of the lens body 648 extends from the outer surface 750 to the inner surface 751 without tapering, so that the peripheral wall is generally in alignment with the optical axis 521 and the outer surface 750 and the inner surface 751 are generally the same in shape and size (e.g., except for minor deviations such as the projections 649). In other implementations, the peripheral wall of the lens body 648 may be tapered. For example, the peripheral wall of the lens body 648 may be tapered progressively away from the optical axis 521 in a direction of travel extending from the outer surface 750 to the inner surface 751, so that that the size of the outer surface 750 is smaller than the size of the inner surface 751.

Figure 8:
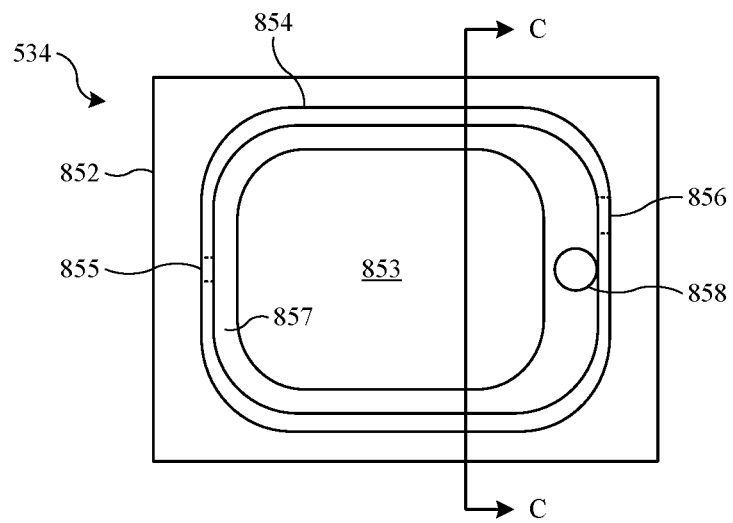
FIG. 8 is a front view illustration that shows a housing body of an optical module housing assembly
Figure 9:
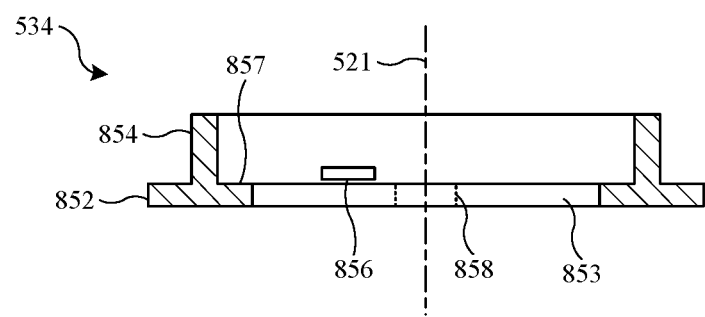
FIG. 9 is a cross-section view illustration taken along line C-C of FIG. 8 showing the housing body.

FIG. 8 is a front view illustration that shows the housing body 534 of the optical module housing assembly 522, and FIG. 9 is a cross-section view illustration taken along line C-C of FIG. 8 showing the housing body 534. The housing body 534 includes a base portion 852, an optical pathway opening 853 that is formed through the base portion 852, a peripheral wall 854 that extends around the optical pathway opening 853.

The base portion 852 extends generally perpendicular to the optical axis 521 of the optical module 520. The base portion 852 may incorporate features that allow attachment of other components to the optical module housing assembly 522. As one example, the display assembly 524 may be attached to the base portion 852 (e.g., by fasteners or adhesives). As another example, the eye camera 530 may be attached to the base portion 852 (e.g., by fasteners or adhesives).

The peripheral wall 854 extends outward from the base portion 852 in a direction that is generally toward the user and generally aligned with the optical axis 521 of the optical module 520. As viewed along the optical axis 521, the shape and size of the peripheral wall 854 is similar to that of the outer periphery of the lens 526, since the peripheral wall 854 is part of the structure that supports and retains the lens 526, as will be described further herein. A vent port 855 is formed through the peripheral wall 854 and may extend, for example, between inner and outer surfaces of the peripheral wall 854 in a direction that is generally perpendicular to the optical axis 521 of the optical module 520. An electrical port 856 is formed through the peripheral wall 854 and may extend, for example, between inner and outer surfaces of the peripheral wall 854 in a direction that is generally perpendicular to the optical axis 521 of the optical module 520.

A base surface 857 is defined on the base portion 852 and is located inward from the peripheral wall 854. The base surface 857 is adjacent to and extends around the optical pathway opening 853, which is an opening that is defined by the housing body 534 to allow light to travel from the display assembly 524 to the lens 526. A camera opening 858 is formed through the base surface 857 and is adjacent to, but separate from, the optical pathway opening 853. The camera opening 858 extends through the base surface 857 in a direction that is generally toward the user. As examples the camera opening 858 may extend through the base surface 857 in a direction that is generally aligned with the optical axis 521 of the optical module 520, or within 45 degrees of parallel to the optical axis 521 of the optical module 520.

Figure 10:
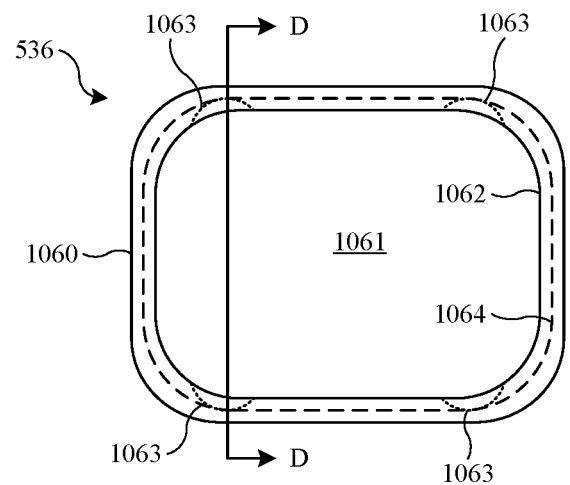
FIG. 10 is a front view illustration that shows a retainer of the optical module housing assembly.
Figure 11:
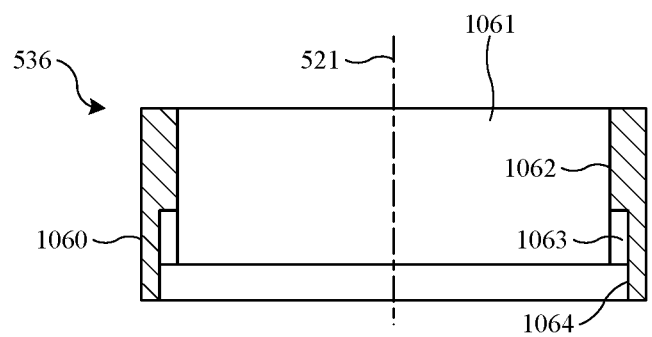
FIG. 11 is a cross-section view illustration taken along line D-D of FIG. 10 showing the retainer.

FIG. 10 is a front view illustration that shows the retainer 536 of the optical module housing assembly 522, and FIG. 11 is a cross-section view illustration taken along line D-D of FIG. 10 showing the retainer 536. The retainer 536 includes a peripheral wall 1060 that extends around an optical pathway opening 1061. The peripheral wall 1060 includes an upper inner periphery portion 1062 that borders and extends around the optical pathway opening 1061. The upper inner periphery portion 1062 is configured to receive the lens body 648 of the lens 526. Channels 1063 are formed in the upper inner periphery portion 1062 and are open to the optical pathway opening 1061. The size and position of the channels 1063 corresponds to the size and position of the projections 649 of the lens 526 such that the projections 649 can be received in the channels 1063 to secure the lens 526 relative to the housing body 534 and restrain relative movement. The peripheral wall 1060 includes a lower inner periphery portion 1064 that borders and extends around the optical pathway opening 1061. The lower inner periphery portion 1064 is configured for connection to the peripheral wall 854 of the housing body 534.

Figure 12:
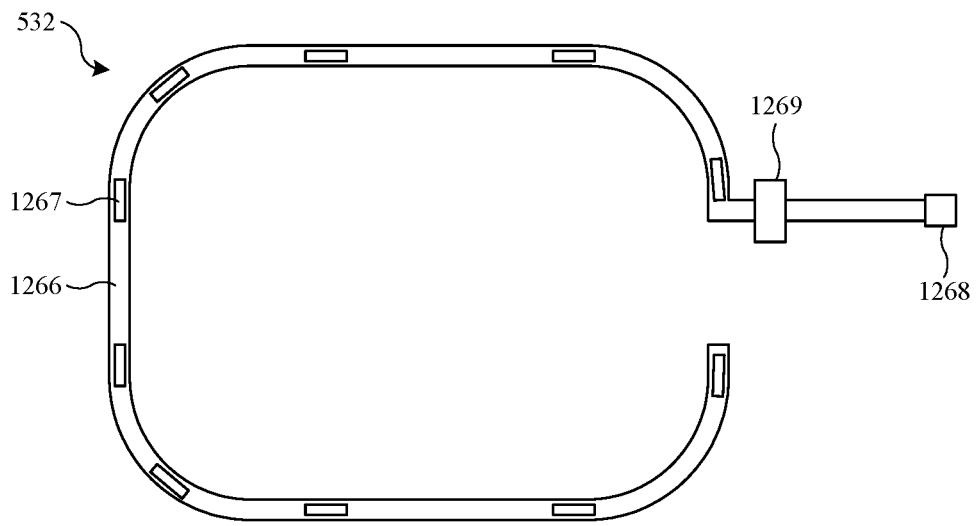
FIG. 12 is a front view illustration that shows an infrared emitter.

FIG. 12 is a front view illustration that shows the infrared emitter 532. The infrared emitter 532 includes a flexible circuit 1266, emissive components 1267, an electrical connector 1268, and a sealing element 1269. The flexible circuit 1266 is a flexible substrate that has electrical conductors formed on it. The flexible substrate may be nonconductive polymer film. The electrical conductors may be conductive traces formed from copper. As an example, the flexible circuit 1266 may be formed by multiple layers of nonconductive polymer film with conductive traces formed between adjacent layers of the film. As will be explained further herein, the shape of the flexible circuit 1266 may be arranged such that is conforms to the shape of a portion of the optical module housing assembly 522 such that the infrared emitter may be located in or connected to the optical module housing assembly 522. In the illustrated example, the flexible circuit 1266 has a c-shaped configured that allows the flexible circuit 1266 to extend around the optical axis 521 of the optical module 520 so that the emissive components 1267 may be arranged around the optical axis 521 in an array without blocking the optical path (pathway along which light may travel) between the display assembly 524 and the lens 526 of the optical module 520.

The emissive components 1267 are components that are configured to emit infrared radiation within one or more wavelength bands. The infrared radiation that is emitted by the emissive components 1267 and reflected by the user's eye may be imaged by the eye camera 530 for use in imaging tasks.

The emissive components 1267 may be for example, infrared light emitting diodes. In one implementation, the emissive components 1267 include a first group of components that are configured to emit infrared radiation in a first wavelength band and a second group of components that are configured to emit infrared radiation in a second wavelength band. The first and second wavelength bands may correspond to different imaging tasks. As an example, the first wavelength band may be configured for use in biometric identification by iris scanner (e.g., a wavelength band including 850 nanometers), and the second wavelength band may be configured for use in eye gaze direction tracking (e.g., a wavelength band including 940 nanometers).

Figure 13:
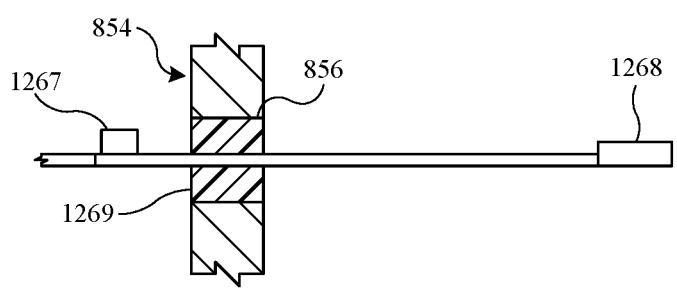
FIG. 13 is a cross-section view illustration showing a portion of the infrared emitter and a peripheral wall of the housing body.

The electrical connector 1268 of the infrared emitter 532 is a standard component of any suitable type that allows connection to other components to provide electrical power and, optionally, operating commands, to the infrared emitter 532. The sealing element 1269 is formed on the flexible circuit 1266 between the electrical connector 1268 and the emissive components 1267. As best seen in FIG. 13, which is a cross-section view illustration showing the flexible circuit and a portion of the peripheral wall 854 of the housing body 534 of the optical module housing assembly 522, the flexible circuit 1266 extends through and is surrounded by the sealing element 1269. The sealing element 1269 is formed from a resilient flexible material that is configured to engage a portion of the optical module housing assembly 522 to allow the flexible circuit 1266 to exit the interior of the optical module housing assembly 522 without providing a pathway along which foreign particles (e.g., dust particles) may enter the interior of the optical module housing assembly 522. As an example, the sealing element 1269 may be formed from silicone that is overmolded onto the flexible circuit 1266 such that the flexible circuit extends through the sealing element 1269. In the illustrated example, the flexible circuit 1266 extends through the electrical port 856 of the housing body 534 such that the sealing element 1269 is located in the electrical port 856 and is engaged with the housing body 534 ad the electrical port 856 to define a seal and occupy the electrical port 856 to prevent entry of foreign particles.

Figure 14:
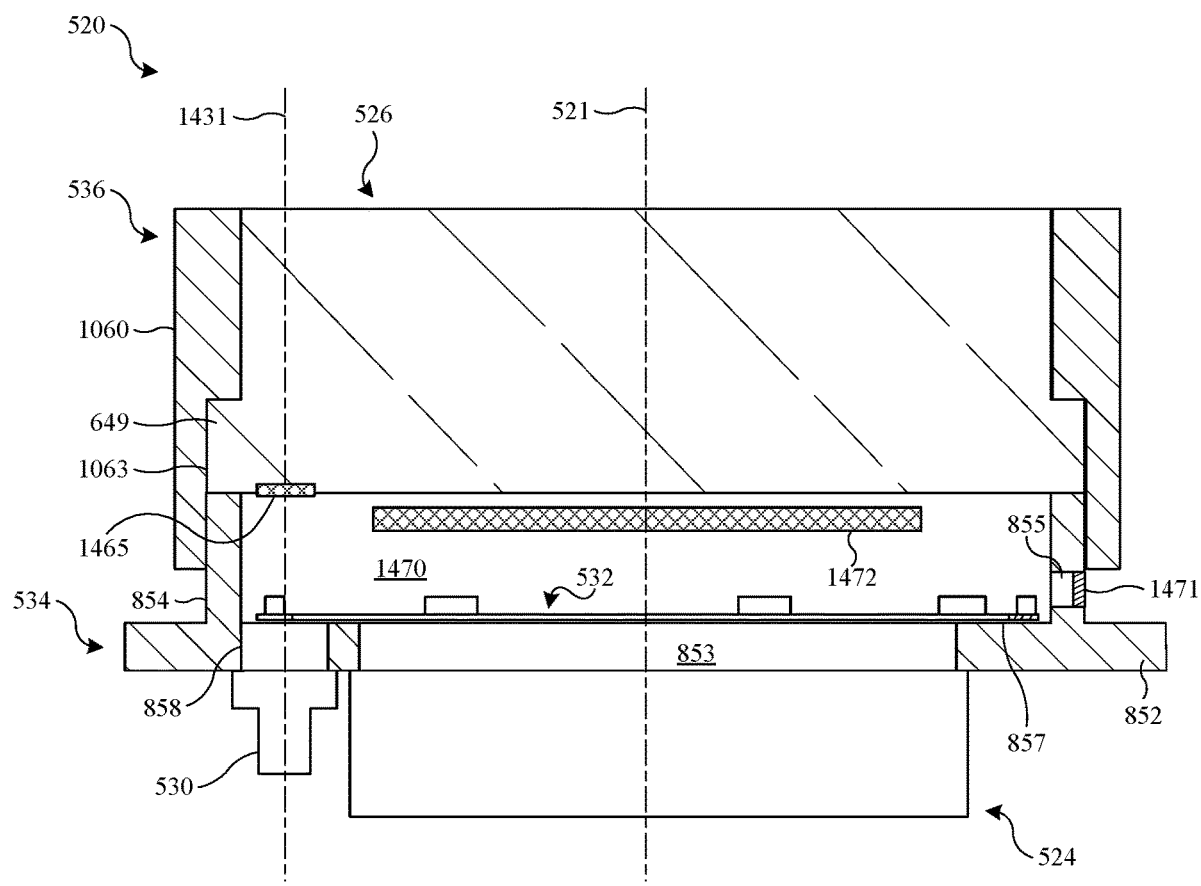
FIG. 14 is a cross-section view illustration that shows the optical module.

FIG. 14 is a cross section view illustration that shows the optical module 520.

The lens 526 is disposed between the housing body 534 and the retainer 536. The housing body 534 is connected to the retainer 536 such that the lens 526 is located between the housing body 534 and the retainer 536. Thus, the housing body 534 and the retainer 536 engage the lens 526 such that the lens 526 is restrained from moving relative to the housing body 534 and the retainer 536. To protect the lens 526 from damage (e.g., if the head-mounted device 100 is dropped), a layer of adhesive may be present between the lens 526 and portions of the housing body 534 and/or the retainer 536. The adhesive that is used for this purposes is strong to secure the lens 526 in a desired alignment and is flexible and elastic to cushion the lens 526 in the event of vibration or impact shock, and to allow the lens 526 to return to its original position.

The vent port 855 is formed through the peripheral wall 854 of the housing body 534 and allows air to enter and exit an internal space 1470 of the optical module 520. The internal space 1470 is defined within the optical module housing assembly 522 by the housing body 534 and the retainer 536 and between the lens 526 and the display assembly 524. The internal space 1470 is sealed from the outside environment except at the vent port 855. The vent port 885 is a passage that allows air to travel between the internal space 1470 and the outside environment that is located around the optical module 520. By allowing air to enter and exit the internal space 1470, air pressure within the internal space 1470 remains at or near ambient (e.g., outside the optical module 520) air pressure. To exclude foreign particles from the internal space 1470, a filter element 1471 is connected to the vent port 885 such that any air that passes through the vent port 855 must pass through filter element 1471. The filter element 1471 is configured to restrain foreign particles from entering the internal space through the vent port 885 (e.g., by preventing entry of foreign particles that are larger than a pore size of the filter material). As examples, the filter element 1471 may be located in or on the vent port 855. The filter element 1471 has a small pore size that is intended to exclude small particles (e.g., dust particles) from the internal space 1470. As one example, the filter element 1471 may be formed from a polytetrafluoroethylene (PTFE) filter material. To capture particles that are present inside the internal space 1470, a dust trap 1472 may be located in the internal space 1470, for example, connected to an internal surface of the housing body 534. The dust trap 1472 is configured to retain foreign particles on its surface, so that the foreign particles do not instead settle on surfaces where they may cause an optical aberration. As an example, the dust trap 1472 may be an adhesive element, such as a sheet coated in adhesive material, to which airborne particles that are inside the internal space 1470 may become affixed, which prevents the particles from attaching to the display assembly 524, or the lens 526, which could cause optical aberrations that are perceptible to the user (e.g., a visual artifact similar to a dead pixel).

The eye camera 530 is a still image camera or video camera that is configured to obtain images. When in use, the images that are obtained by the eye camera 530 include a visual representation of part of or all of the user's eye, so that the obtained images may be used for biometric identification (e.g., verifying the identity of the user based on an image of the user's eye) and gaze tracking. In the implementations that are discussed herein, the eye camera 530 is sensitive to infrared light (i.e., electromagnetic radiation in the infrared portion of the electromagnetic spectrum). Thus, the eye camera 530 may be configured to obtain images that show reflected portions of the infrared radiation that is emitted by the infrared emitter 532, and these reflected portions of infrared radiation, as represented in the images, are useful for observing and identifying features of the user's eye, which may be done using a machine vision-based system that is implemented in software that is executed by the head-mounted device 100. In alternative implementations, the eye camera 530 may instead by implemented using a visible spectrum camera or may be supplemented using the visible spectrum camera in addition to an infrared spectrum camera.

Figure 15:
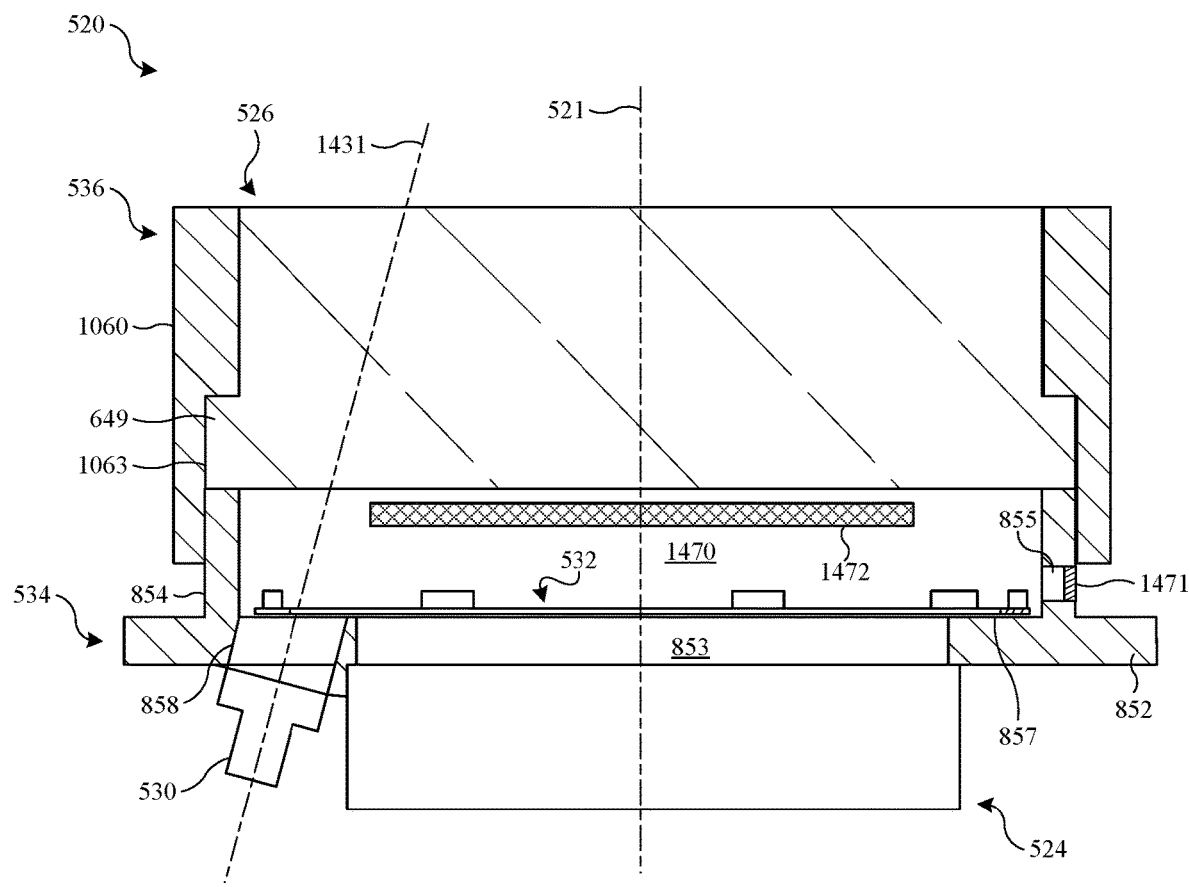
FIG. 15 is a cross-section view illustration that shows the optical module according to an alternative implementation in which an optical axis of the eye camera is angled toward an optical axis of the optical module.

The eye camera 530 is connected to the housing body 534 of the optical module housing assembly 522 adjacent to the camera opening 858 of the housing body 534 such that an optical axis 1431 of the eye camera 530 extends through the camera opening 858. In the illustrated example, the eye camera 530 is oriented such that an optical axis 1431 of the eye camera 530 is substantially aligned with the optical axis 521 of the optical module 520. However, the eye camera 530 is positioned near an outer periphery of the lens 526 and is therefore offset and outward from the optical axis 521 of the optical module 520. Thus, the housing body 534 and/or the eye camera 530 may be configured (e.g., by an inclined mounting surface) such that the optical axis 1431 of the eye camera 530 is angled toward the optical axis 521 of the optical module 520, as shown in FIG. 15, which is a cross-section view illustration that shows the optical module 520 according to an alternative implementation.

Returning to FIG. 14, in some implementations, a fiducial marker 1465 may be formed on the lens 526. The fiducial marker 1465 is any manner of marking that can be perceived and located in images obtained by the eye camera 530. The fiducial marker 1465 is visible in images obtained by the eye camera 530 for use in calibration. The head-mounted device 100 is calibrated to account for manufacturing conditions, user attributes, and/or other factors that may cause visual aberrations. During an initial calibration, the position of the fiducial marker 1465 is determined and stored. The lens 526 may shift with respect to other components, such as the optical module housing assembly 522, for example, if the head-mounted device 100 is dropped. The changed position of the lens 526 can be identified by comparing the position of the lens 526 in images obtained by the eye camera 530 with the position of the lens 526 in the images that was obtained at the time of calibration. In response to determining that the lens position has changed, calibration is performed again to address any visual aberrations that may have resulted from the shift in position of the lens 526.

The infrared emitter 532 is located on the base surface 857 of the housing body 534 and extends around the optical axis 521 within the internal space 1470 that is defined within the optical module housing assembly 522 by the housing body 534 and the retainer 536 and between the lens 526 and the display assembly 524. The display assembly 524 is connected to the housing body 534 of optical module housing assembly 522 adjacent to the optical pathway opening 853 of the housing body 534.

In one implementation, the optical module 520 includes the optical module housing assembly 522, the display assembly 524, the lens 526, and the eye camera 530. The lens 526 is positioned at a first end of the optical module housing assembly 522, the display assembly and the eye camera 530 are positioned at a second end of the optical module housing assembly 522, and the internal space 1470 is defined within the optical module housing assembly 522 between the first end and the second end. The lens 526 is positioned such that it is able to obtain images of the user's eye through the lens 526. The lens 526 may be connected to the optical module housing assembly 522 such that it is positioned adjacent to the display assembly 524, such as in a side-by-side arrangement with respect to the display assembly 524.

In one implementation, the optical module 520 includes the optical module housing assembly 522, the display assembly 524, the lens 526, and the infrared emitter 532. The lens 526 is positioned at a first end of the optical module housing assembly 522, the display assembly is positioned at a second end of the optical module housing assembly 522, and the internal space 1470 is defined within the optical module housing assembly 522 between the first end and the second end. The infrared emitter 532 is positioned in the internal space 1470 between the lens 526 and the display assembly 524. The infrared emitter 532 is positioned such that is able to project infrared radiation onto the user's eye through the lens 526. The optical module 520 also includes the eye camera 530, which is connected to the optical module housing assembly 522 such that the infrared emitter 532 is positioned between (e.g., along the optical axis 521) the eye camera 530 and the lens 526.

The lens 526 may be connected to the optical module housing assembly 522 such that it is positioned adjacent to the display assembly 524, such as in a side-by-side arrangement with respect to the display assembly 524.

Figure 16:
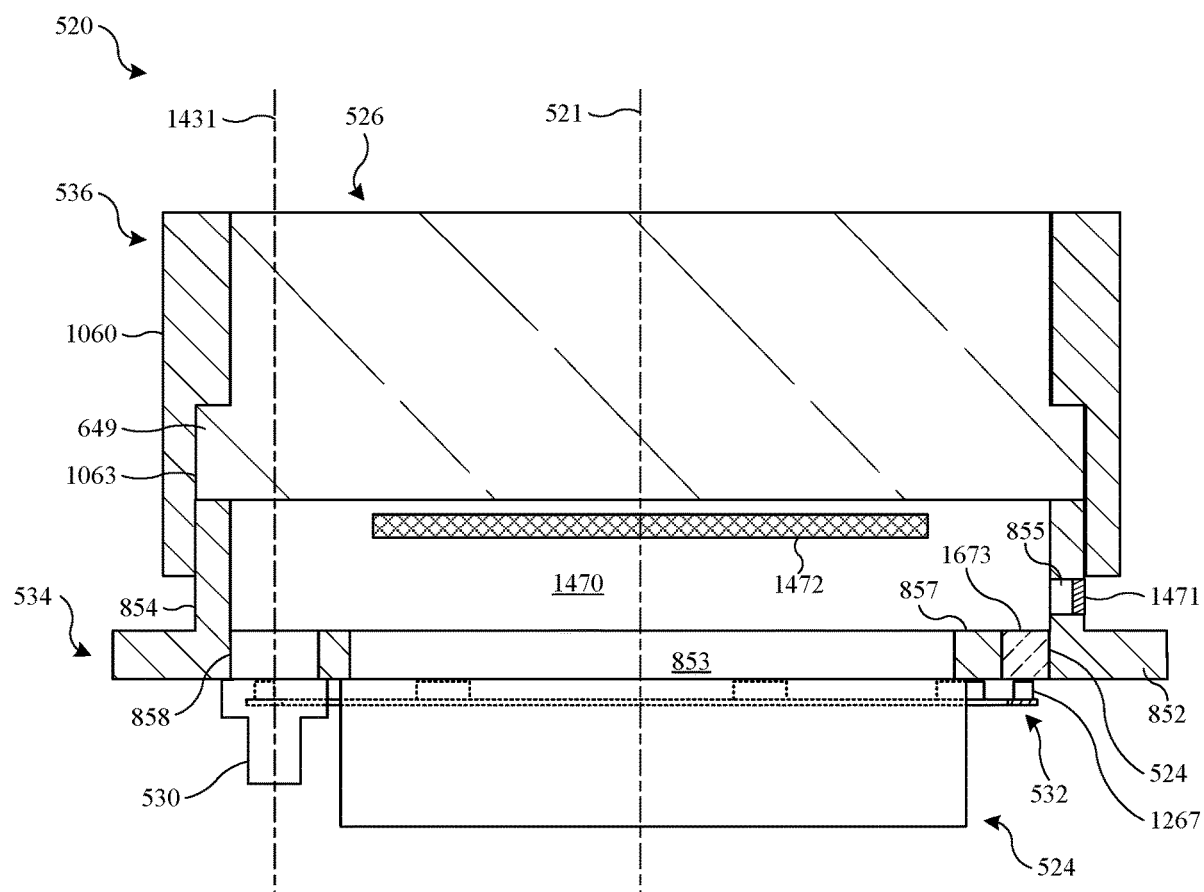
FIG. 16 is a cross-section view illustration that shows the optical module according to an alternative implementation in which the infrared emitter is located outside of the housing body of the optical module housing assembly.

In the implementation shown in FIG. 14, the infrared emitter 532 is located on the base surface 857 of the housing body 534 in the internal space 1470. FIG. 16 is a cross-section view illustration that shows the optical module 520 according to an alternative implementation in which the infrared emitter 532 is located outside of the housing body 534 of the optical module housing assembly 522. In this implementation, the infrared emitter 532 is connected (e.g., by an adhesive) to an exterior surface of the housing body 534 such that it is positioned adjacent to and extends around the display assembly 524.

An infrared-transmissive panel 1673 is formed in the housing body 534 to allow infrared radiation that is emitted by the infrared emitter 532 to travel through the optical module housing assembly 522 and the lens 526. The infrared-transmissive panel 1673 is formed from a material that allows infrared radiation to pass through it without significant losses. As examples, the infrared-transmissive panel 1673 may be formed from glass or from an infrared transmissive plastic. In the illustrated example, the infrared-transmissive panel 1673 extends through an aperture that is formed through the base surface 857. The infrared-transmissive panel 1673 may be a single panel that extends along the base surface 857 adjacent to all of the emissive components 1267 of the infrared emitter 532, or may be multiple panels that extend through separate apertures that are formed through the base surface 857 adjacent to individual ones of the emissive components 1267. In some implementations, the infrared-transmissive panel 1673 may be omitted in favor of forming part or all of the optical module housing assembly 522 (e.g., the housing body 534) from an infrared-transmissive material.

In the examples shown in FIGS. 14-16, the optical module 120 is shown as including a single eye camera, which is represented by the eye camera 530. The optical module 120 could instead include more than one eye camera (e.g., two eye cameras), with each of the eye cameras being configured to obtain images showing infrared radiation that is reflected from the eye of the user. The eye cameras are located at different locations (e.g., opposite lateral sides of the eye of the user) and may be oriented at different angular orientations. The images output by multiple eye cameras may provide a more complete view of the eye of the user.

Figure 17:
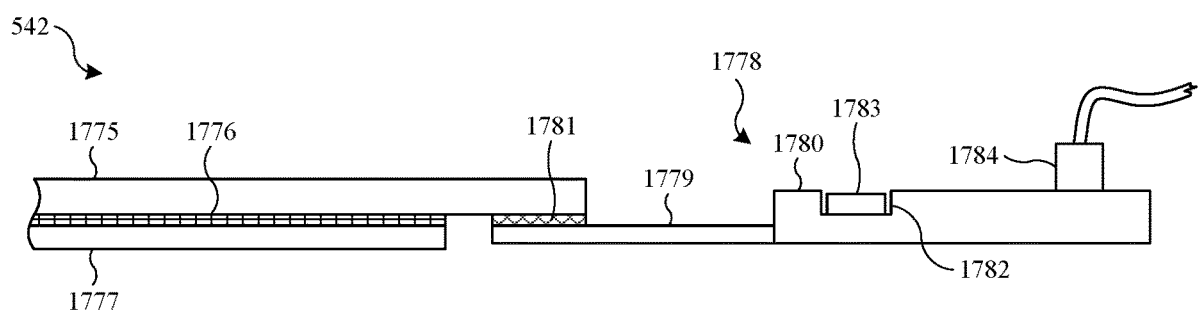
FIG. 17 is a side-view illustration that shows a display module according to an implementation.

FIG. 17 is a side-view illustration that shows the display module 542 according to an implementation. The display module 542 includes a silicon wafer 1775 and a display element layer 1776 (e.g., an organic light-emitting diode layer) that is located on the silicon wafer 1775. The display element layer 1776 may be covered by a glass layer 1777. A display connector 1778 includes a first portion 1779 and a second portion 1780. The first portion 1779 of the display connector 1778 is a flexible connector (e.g., a two-layer flexible connector) that is connected to silicon wafer 1775 by an electrical connection 1781 that connects individual conductors formed on the silicon wafer 1775 with individual conductors formed on the first portion 1779 of the display connector 1778. As an example, the electrical connection 1781 may include an anisotropic film that bonds the display connector 1778 to the silicon wafer 1775 while allowing electrical communication.

The second portion 1780 of the display connector 1778 is a multi-layer (e.g., six layer) flexible connector, of the type commonly referred to as a "rigid flex" connector. The second portion 1780 may include a cavity 1782 that is defined by removal of one or more of the layers of the multi-layer structure of the second portion 1780. A driver integrated circuit 1783 is located in the cavity 1782 in order to protect the driver integrated circuit 1783. The function of the driver integrated circuit 1783 is to receive display signals in a first format (e.g., encoded or multiplexed) and interpret the signals into a second format that is usable by the display element layer 1776 of the display module 542 to output images. A connector 1784 (e.g., a micro-coaxial connector) may be located on and electrically connected to the second portion 1780 of the display connector 1778 in order to connect the display module 542 to other components (e.g., to a computing device that provides content to be displayed).

Figure 18:
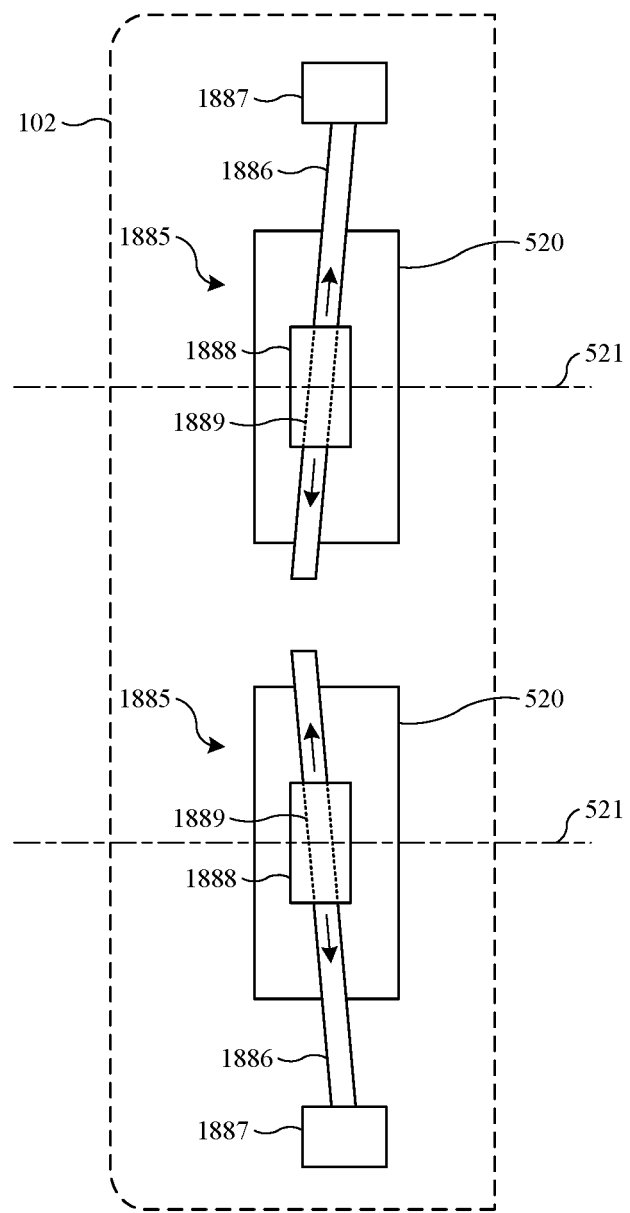
FIG. 18 is a top-view illustration that shows interpupillary adjustment mechanisms that each support one of the optical modules.

FIG. 18 is a top-view illustration that shows interpupillary distance adjustment mechanisms 1885 that each support one of the optical modules 520 (i.e., left and right optical modules) with respect to the device housing 102. The interpupillary distance adjustment mechanisms 1885 are an example of an interpupillary distance adjustment assembly that is configured to adjust a distance between the optical modules 520 that display content to the left eye and the right eye of the user, in order to match the spacing between the optical modules 520 with the spacing between the user's eyes.

The optical modules 520 may be supported such that the optical axis 521 of each of the optical modules 520 extends generally in a front-to-back direction of the device housing 102. The interpupillary distance adjustment mechanisms 1885 include support rods 1886 and actuator assemblies 1887 that are configured to cause movement of the optical modules 520 along the support rods 1886 in response to a control signal. The actuator assemblies 1887 may include conventional motion control components such as electric motors that are connected to the optical modules 520 by components such as lead screws or belts to cause movement. Mounting brackets 1888 may be connected to the optical modules 520 such that the support rods 1886 are connected to the mounting brackets 1888, such as by extending through apertures 1889 that are formed through the mounting brackets 1888. The interpupillary distance adjustment mechanisms 1885 may also include biasing elements such as springs that are engaged with the mounting brackets 1888 to reduce or eliminate unintended motion of the mounting brackets 1888 and/or the optical modules 520 with respect to the support rods 1886. The support rods 1886 may be angled relative to a lateral (e.g., side-to-side) dimension of the device housing 102 such that they move toward the user as they move outward. As an example, the support rods may be angled by five degrees relative to the lateral dimension.

Figure 19:
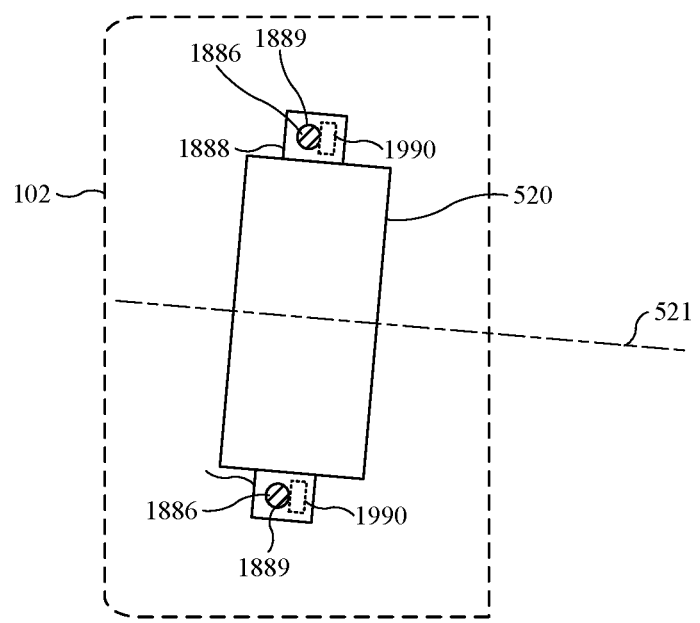
FIG. 19 is a side view illustration that shows one of the interpupillary adjustment mechanisms.

FIG. 19 is a side view illustration that shows one of the interpupillary distance adjustment mechanisms 1885. The support rods 1886 may include upper and lower support rods for each of the optical modules that support the optical modules 520 such that the optical axis 521 of each optical module 520 is angled slightly downward, such as by five degrees. Springs 1990 (e.g., leaf springs) may be seated in the apertures 1889 of the mounting brackets 1888 and located forward from the support rods 1886 to bias the optical modules 520 toward the user.

Figure 20:
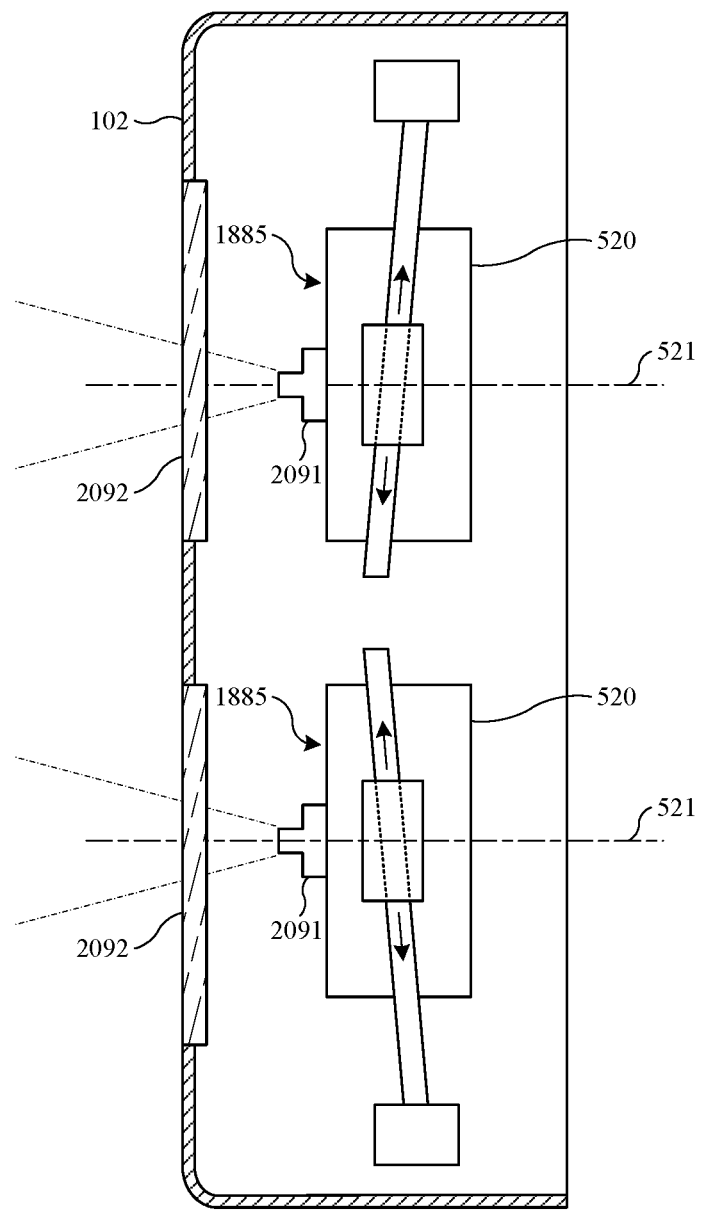
FIG. 20 is a top-view cross-section illustration that shows front-facing cameras that are supported by each of the optical modules.

FIG. 20 is a top-view cross-section illustration that shows front-facing cameras 2091 that are supported by each of the optical modules 520. Openings or optically-transmissive panels 2092 (e.g., clear plastic) are included in the device housing 102 such that the front-facing cameras 2091 are able to obtain images of the surrounding environment through the optically-transmissive panels 2092. A single panel or separate panels may be used for the optically-transmissive panels 2092, and as such the device housing 102 may include one or more of the optically-transmissive panels 2092. Thus, the device housing 102 may include one or more of the optically-transmissive panels 2092 through which the front-facing cameras may obtain images of an environment from a point of view that simulates the point of view of the user. The front-facing cameras 2091 may be connected to and supported by a corresponding one of the optical modules 520. The front-facing cameras 2091 may be positioned such that they are located on and substantially aligned with the optical axis 521 of a corresponding one of the optical modules 520 (e.g., the optical axes of the front-facing cameras 2091 may be substantially aligned with the optical axes of the optical modules 520). The front-facing cameras 2091 are oriented away from the user and are supported such that they are moved by the interpupillary distance adjustment mechanisms 1885. Accordingly, when the user adjusts the interpupillary distance between the optical modules 520, the distance between the front-facing cameras 2091 is also adjusted. Thus, images from the front-facing cameras 2091, when displayed to the user, have been captured at the user's own interpupillary distance and therefore are presented more accurately in stereo vision. Thus, in some implementations, the optical axis of a first one of the front-facing cameras 2091 is aligned with an optical axis of a first one of the optical modules 520 and an optical axis of a second one of the front-facing cameras 2091 is aligned with an optical axis of a second one of the optical modules 520. Thus, in some implementations, a first one of the front-facing cameras 2091 is connected in a fixed relationship with respect to a first one of the optical modules 520, and a second one of the front-facing cameras 2091 is connected in a fixed relationship with respect to a second one of the optical modules 520. Thus, in some implementations, the interpupillary distance adjustment mechanisms a first spacing between an optical axis of a first one of the optical modules 520 and an optical axis of a second one of the optical modules 520 generally equal to a second spacing between an optical axis of a first one of the front-facing cameras 2091 and an optical axis of a second one of the front facing cameras 2091 during adjustment of the distance between the optical modules 520.

Figure 21:
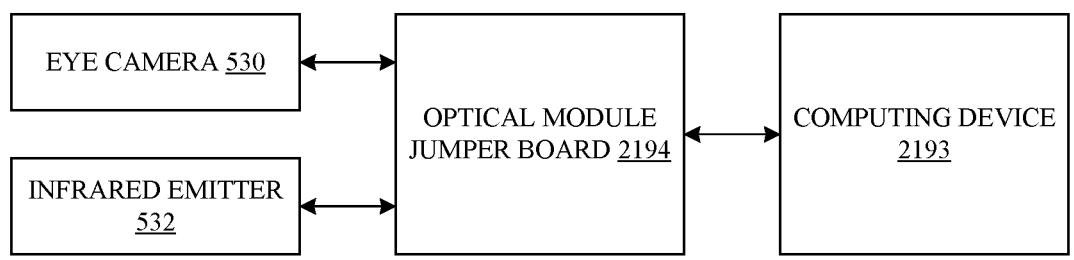
FIG. 21 is an illustration that shows connection of the eye camera and the infrared emitter to a computing device by an optical module jumper board.

FIG. 21 is an illustration that shows connection of the eye camera 530 and the infrared emitter 532 to a computing device 2193 by an optical module jumper board 2194. The computing device 2193 may be, for example, a computing device that incorporates the processor 108 of the head-mounted device 100. The optical module jumper board 2194 has a data connection to the computing device 2193 over which signals and data to and from the eye camera 530 and the infrared emitter 532 are transmitted. The optical module jumper board 2194 also has separate data connections to each of the eye camera 530 and the infrared emitter 532. Additional components could be included in the optical module 520 and connected to the optical module jumper board 2194 by additional separate connections. The optical module jumper board 2194 may be mounted to the optical module 520, and therefore, moves in unison with the optical module 520 during interpupillary distance adjustment. As a result, the number and size of electrical connections that are made to components that are not mounted to the optical module (e.g., the computing device 2193) is decreased. The optical module jumper board 2194 may be, as examples, a rigid flex circuit board, a flexible circuit board, or a printed component board.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to adjust the fit and comfort of a head-mounted device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores fit and comfort related information that allows the head-mounted device to be actively adjusted for a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to allow automatic adjustment of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fit and comfort related parameters may be determined each time the head-mounted device is used, such as by scanning a user's face as they place the device on their head, and without subsequently storing the information or associating with the particular user.

What is claimed is:

1. An optical module for a head-mounted device that is configured to present content to a user, the optical module comprising:
    an optical module housing assembly that has a first end and a second end, wherein the optical module housing assembly includes a wall that extends around an axis to define an internal space between the first end and the second end;
    a lens that is connected to the optical module housing assembly and is positioned at the first end of the optical module housing assembly;
    a display assembly that is connected to the optical module housing assembly and is positioned at the second end of the optical module housing assembly; and
    an infrared emitter that is coupled to the wall within the optical module housing assembly at the second end of the optical module housing assembly near the display assembly such that the infrared emitter extends around an optical axis,
    wherein the display assembly is configured to emit light corresponding to the content along the axis of the optical module housing assembly and through the lens to be displayed to the user.

2. The optical module of claim 1, wherein the optical module housing assembly includes a first portion that is connected to a second portion, and the lens is engaged by the first portion of the optical module housing assembly and the second portion of the optical module housing assembly such that the lens is retained between the first portion and the second portion and restrained from moving relative to the optical module housing assembly.

3. The optical module of claim 1, wherein the lens and the display assembly are connected to the optical module housing assembly in a side-by-side arrangement.

4. The optical module of claim 1, wherein the internal space of the optical module housing assembly extends between the lens and the display assembly.

5. The optical module of claim 4, further comprising:
    a vent port that allows air to travel between the internal space and an outside environment; and
    a filter element that restrains foreign particles from entering the internal space.

6. The optical module of claim 4, further comprising:
    a dust trap that is located in the internal space and is configured to retain foreign particles.

7. The optical module of claim 6, wherein the dust trap includes an adhesive element configured to retain the foreign particles.

8. The optical module of claim 1, wherein the lens is a catadioptric lens.

9. The optical module of claim 1, wherein the lens is a part of a catadioptric optical system.

10. The optical module of claim 1, further comprising:
    an eye camera that is connected to the optical module housing assembly and is positioned at the second end of the optical module housing assembly, wherein the eye camera is configured to obtain images through the lens.

11. The optical module of claim 10, further comprising:
    a fiducial marker that is formed on the lens and is visible in images obtained by the eye camera for use in calibration.

12. The optical module of claim 1, wherein the infrared emitter includes an emissive component configured to emit infrared radiation within one or more wavelength bands.

13. The optical module of claim 12, wherein the emissive component includes an infrared light emitting diode.

14. An optical module for a head-mounted device that is configured to present content to a user, the optical module comprising:
    an optical module housing assembly that has a first end and a second end, the optical module housing assembly including a first portion that is connected to a second portion;
    a lens that is connected to the optical module housing assembly, is positioned at the first end of the optical module housing assembly, and is retained between the first portion of the optical module housing assembly and the second portion of the optical module housing assembly, wherein projections are defined on the lens and channels are defined on the first portion of the optical module housing assembly such that the projections are located in the channels and engage the first portion of the optical module housing assembly within the channels to secure the lens relative to the optical module housing assembly and restrain movement of the lens relative to the optical module housing assembly; and
    a display assembly that is connected to the optical module housing assembly and is positioned at the second end of the optical module housing assembly, wherein the display assembly is configured to cause the content to be displayed to the user through the lens.

15. An optical module for a head-mounted device that is configured to present content to a user, the optical module comprising:
    an optical module housing assembly;
    a lens that is connected to the optical module housing assembly;
    a display assembly that is connected to the optical module housing assembly, wherein the display assembly is configured to cause the content to be displayed to the user through the lens, and the optical module housing assembly, the lens, and the display assembly cooperate to define an enclosed internal space; and an infrared emitter that is located between the lens and the display assembly in the enclosed internal space, wherein the infrared emitter includes an emissive component that is oriented toward the lens and is configured to emit infrared radiation away from the display assembly and through the lens.

16. The optical module of claim 15, wherein the infrared emitter includes a flexible circuit and the emissive components are connected to the flexible circuit.

17. The optical module of claim 16, wherein the emissive components are arranged in an array around an optical axis of the optical module housing assembly and are located between the lens and the display assembly along the optical axis.

18. The optical module of claim 15, wherein the optical module housing assembly defines an optical pathway opening that is adjacent to the display assembly and is configured to allow light to pass from the display assembly to the lens, a base surface that extends around the optical pathway opening, wherein the infrared emitter is located on the base surface, and a peripheral wall that is located outward from the base surface and extends around the optical pathway opening.

19. The optical module of claim 15, further comprising:
an eye camera that is configured to obtain images that show reflected portions of the infrared radiation that is emitted by the infrared emitter.

20. The optical module of claim 19, wherein the eye camera is connected to the optical module housing assembly and is configured to obtain the images through the lens.

21. The optical module of claim 15, wherein the lens is a catadioptric lens.

22. The optical module of claim 15, wherein the lens is a part of a catadioptric optical system.

23. An optical module for a head-mounted device that is configured to present content to a user, the optical module comprising:
an optical module housing assembly that defines an internal space:
a lens that is connected to the optical module housing assembly, wherein the display assembly is configured to cause the content to be displayed to the user through the lens;

a display assembly that is connected to the optical module housing assembly, wherein the display assembly is configured to cause the content to be displayed to the user through the lens: and an infrared emitter that is located between the lens and the display assembly in the internal space of the optical module housing assembly, the infrared emitter including a flexible circuit and emissive components that are connected to the flexible circuit and are configured to emit infrared radiation, wherein the infrared emitter is configured to emit infrared radiation through the lens, and the flexible circuit extends through an electrical port that is formed through the optical module housing assembly and a sealing element is formed on the flexible circuit and is engaged with the optical module housing assembly at the electrical port.

24. An apparatus, comprising:
a housing that has a ring-like configuration that extends along an optical axis;
a lens that is connected to the housing;
a display that is connected to the housing and is oriented to emit light corresponding to content along the optical axis and toward the lens;
infrared light emitting diodes that include emissive components that are located in the housing and oriented away from the display and toward the lens to emit infrared radiation through the lens; and
a camera that is connected to the housing and configured to obtain images showing the infrared radiation.

25. The apparatus of claim 24, wherein the lens is arranged on the optical axis and the infrared light emitting diodes are arranged in an array around the optical axis.

26. The apparatus of claim 24, wherein the infrared light emitting diodes include a first group of light emitting diodes that are configured to emit the infrared radiation in a first wavelength band and a second group of light emitting diodes that are configured to emit the infrared radiation in a second wavelength band.

27. The apparatus of claim 24, wherein the housing defines a first end, the housing defines a second end, the lens is at the first end of the housing, the display is at the second end of the housing, and the camera is at the second end of the housing.

28. The apparatus of claim 27, wherein the housing defines an internal space, and the infrared light emitting diodes are in the internal space of the housing.

* * * * *